(12) United States Patent
Yamada et al.

(10) Patent No.: US 10,338,450 B2
(45) Date of Patent: Jul. 2, 2019

(54) ELECTROCHROMIC ELEMENT UNIT, DIMMING WINDOW, AND IMAGING DEVICE

(71) Applicant: CANON KABUSHIKI KAISHA, Tokyo (JP)

(72) Inventors: Kenji Yamada, Yokohama (JP); Kousuke Kiyamura, Kawasaki (JP); Kentaro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/694,640

(22) Filed: Sep. 1, 2017

(65) Prior Publication Data
US 2018/0067371 A1 Mar. 8, 2018

(30) Foreign Application Priority Data

Sep. 5, 2016 (JP) .................. 2016-173143
Jun. 8, 2017 (JP) .................. 2017-113621

(51) Int. Cl.
| | | |
|---|---|---|
| *G02F 1/163* | (2006.01) | |
| *G02F 1/161* | (2006.01) | |
| *G02F 1/155* | (2006.01) | |
| *E06B 3/67* | (2006.01) | |
| *E06B 9/24* | (2006.01) | |

(52) U.S. Cl.
CPC ............ *G02F 1/163* (2013.01); *E06B 3/6722* (2013.01); *E06B 9/24* (2013.01); *G02F 1/155* (2013.01); *G02F 1/161* (2013.01); *E06B 2009/2417* (2013.01); *E06B 2009/2464* (2013.01)

(58) Field of Classification Search
CPC .......... G02F 1/163; G02F 1/155; G02F 1/153; E06B 2009/2464; E06B 9/24
USPC ........................................................ 359/275
See application file for complete search history.

(56) References Cited

U.S. PATENT DOCUMENTS

| | | | | |
|---|---|---|---|---|
| 2010/0172010 A1* | 7/2010 | Gustavsson | ............. | G02F 1/163 359/265 |
| 2014/0307302 A1* | 10/2014 | Andersson Ersman | ..................... | G02F 1/1533 359/265 |
| 2017/0003563 A1* | 1/2017 | Kubo | ...................... | G02F 1/155 |

FOREIGN PATENT DOCUMENTS

| | | |
|---|---|---|
| JP | H05-11131 U | 2/1993 |
| JP | 2014-098934 A | 5/2014 |

* cited by examiner

*Primary Examiner* — Mohammed A Hasan
(74) *Attorney, Agent, or Firm* — Canon U.S.A., Inc. IP Division (57) ABSTRACT

An electrochromic element unit includes an electrochromic element having a pair of electrodes and an electrochromic layer disposed between the pair of electrodes, and an operation unit connected to the electrochromic element, wherein the operation unit is capable of performing a first type operation and a second type operation, and wherein change in a transmittance of the electrochromic element by the second type operation is different from change in the transmittance of the electrochromic element by the first type operation.

31 Claims, 7 Drawing Sheets

ELECTROCHROMIC ELEMENT UNIT, DIMMING WINDOW, AND IMAGING DEVICE

BACKGROUND

Field of the Disclosure

The present disclosure relates to an electrochromic element unit used for dimming, particularly to an electrochromic element unit including an operation unit for adjusting the amount of transmitted light.

Description of the Related Art

An electrochromic (EC) element is an element in which an optical absorption property (coloration state or light transmittance) of a substance is changed by an electrochemical redox reaction. In recent years, an EC element has been used for a dimming mirror of an automobile, a dimming window for a building and transportation, or a display device such as an electronic paper. Particularly, the dimming window can control the amount of light passing through a window of a building or a vehicle, can also control entrance and exit of heat, and therefore has attracting attention as an energy-saving window. As a unit for adjusting the amount of light passing through the dimming window, a liquid crystal method is also known in addition to the EC method.

Japanese Patent Application Laid-Open No. 2014-98934 discusses a variable transmittance window and a system for controlling a transmittance state of the window. Japanese Patent Application Laid-Open No. 2014-98934 discusses that a system controls the transmittance with user's input information and also controls transmittances of a plurality of windows with information from a master circuit.

Japanese Utility Model Application Laid-Open No. 5-11131 discusses a dimming mirror provided with EC elements on the front and back sides of a glass substrate. Japanese Utility Model Application Laid-Open No. 5-11131 discusses that the transmittance of the dimming mirror is controlled by controlling the transmittances of these two EC elements.

In a variable transmittance window discussed in Japanese Patent Application Laid-Open No. 2014-98934, the amount of change in transmittance induced by one operation by each user is preset. Therefore, in a case where the amount of change in transmittance is changed largely, a complicated operation such as a plurality of operations is required.

A dimming mirror discussed in Japanese Utility Model Application Laid-Open No. 5-11131 has a configuration to obtain a desired transmittance by operating each of two EC elements. Therefore, it is impossible to control the transmittance to a desired transmittance by a single operation, and complicated operations are required.

SUMMARY OF THE DISCLOSURE

The present disclosure is directed to an electrochromic element unit capable of changing a transmittance by a simple operation by including a first type operation and a second type operation having a different amount of change in transmittance from the first type operation.

According to an aspect of the present disclosure, an electrochromic element unit includes an electrochromic element having a pair of electrodes and an electrochromic layer disposed between the pair of electrodes, and an operation unit connected to the electrochromic element, wherein the operation unit is capable of performing a first type operation and a second type operation, and wherein change in a transmittance of the electrochromic element by the second type operation is different from change in the transmittance of the electrochromic element by the first type operation.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings.

An electrochromic (EC) element unit according to an exemplary embodiment includes an EC element having a pair of electrodes and an EC layer disposed between the pair of electrodes, and an operation unit connected to the EC element. The operation unit can perform a first type operation and a second type operation, and change in a transmittance of the EC element by the second type operation is different from change in the transmittance of the EC element by the first type operation. By performing the first type operation and the second type operation, a desired transmittance can be set more easily.

The amount of change in transmittance per unit time by the first type operation is different from that by the second type operation.

The amount of change in transmittance per unit time by the first type operation is different from that by the second type operation, but the amount of change in transmittance per unit time by the first type operation may be the same as that by the second type operation because of a difference in operation time.

The amount of change in the transmittance of the EC element by the second type operation may be larger than that by the first type operation. In this case, the amount of change in the transmittance of the EC element by the second type operation is larger than that by the first type operation. Therefore, it is possible to easily set the transmittance to a desired transmittance. Changing the transmittance of the EC element can be reworded in changing the amount of transmitted light of the EC element.

Figure 1:
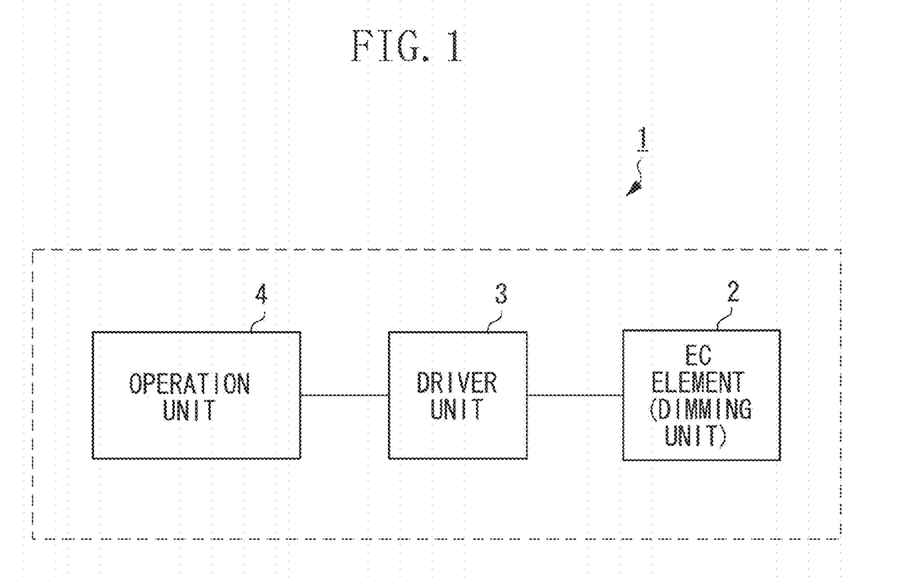
FIG. 1 is a diagram exemplifying an electrochromic (EC) element unit according to one or more aspects of the present disclosure.

FIG. 1 is a schematic diagram exemplifying an EC element unit according to an exemplary embodiment. An EC element unit 1 in FIG. 1 includes an EC element 2, a driver unit 3, and an operation unit 4. The EC element 2 changes the transmittance according to change in voltage from the driver unit 3. The driver unit 3 receives information from the operation unit 4, and controls the transmittance of the EC element 2. The operation unit 4 receives input information from a user, and transmits a signal to the driver unit 3.

The control of the EC element 2 by the driver unit 3 may be performed by a voltage modulation method or a pulse width modulation method. Among these methods, the pulse width modulation method is desirable. This is because the pulse width modulation method keeps an applied voltage constant.

The operation unit 4 can perform the first type operation of changing the transmittance by a certain amount and the second type operation of changing the transmittance by an amount larger than the amount of change in transmittance by the first type operation. The first type operation and the second type operation are desirably operations on a single operation unit.

The single operation unit may be a pair of operation units formed of an operation unit for raising the transmittance and an operation unit for lowering the transmittance. Examples of the operation unit include a button, a switch, and a dial.

The first type operation and the second type operation can be independently performed, and there is no need to have a subordinate relationship that the second type operation cannot be performed without performing the first type operation. In a case where there is no subordinate relationship, the first type operation and the second type operation are clearly distinguished from each other.

An operation until an operation is recognized as the second type operation may be recognized as the first type operation. In this case, the amount of change in the transmittance of the EC element unit with respect to an operation amount is large.

In the EC element unit controlling the transmittance in a plurality of stages, it can be said that the first type operation is change in one stage and the second type operation is change in a plurality of stages. For example, in an EC element unit controlling the transmittance in five stages, the first type operation is an operation of lowering the transmittance by one stage, and the second type operation is an operation of lowering the transmittance by two stages. The EC element unit may be set to have a minimum transmittance by the second type operation.

The EC element unit according the present exemplary embodiment may include a change unit for changing control of the second type operation. For example, the change unit can change setting in which the second type operation is set to change in two stages to setting in which the second type operation is change in three stages. The change unit is not limited to the above-described stage change, but may be a unit for changing the amount of change or a unit for changing a form of the second type operation.

The change unit may be the same as or different from the operation unit for performing the first type operation and the second type operation. In a case where the operation unit for operating the change unit is the same as the operation unit, the change unit may be started by performing a third type operation. Examples of the third type operation include simultaneous depression of the operation unit for raising the transmittance and the operation unit for lowering the transmittance, and depression of a dial type operation unit.

In a first exemplary embodiment, a difference between the first type operation and the second type operation is operation time. Here, as an example of the operation unit, a button type operation unit will be described. The form of the operation unit may be a dial type or another type.

In the present exemplary embodiment, the second type operation is an operation in which the button depression time is longer than that in the first type operation. A threshold value is set for the button depression time, and the first type operation and the second type operation are distinguished from each other. Specifically, in a case where the button depression time is shorter than the threshold value, the operation is the first type operation. In a case where the button depression time is longer than the threshold value, the operation is the second type operation.

The operation unit 4 transmits a signal based on input information to the driver unit 3. The driver unit 3 changes control of the EC element 2 based on the signal from the operation unit, and controls change in the amount of transmitted light of the EC element. By performing the second type operation, the amount of change in the transmittance of the EC element can be larger than that by the first type operation.

Figure 2A:
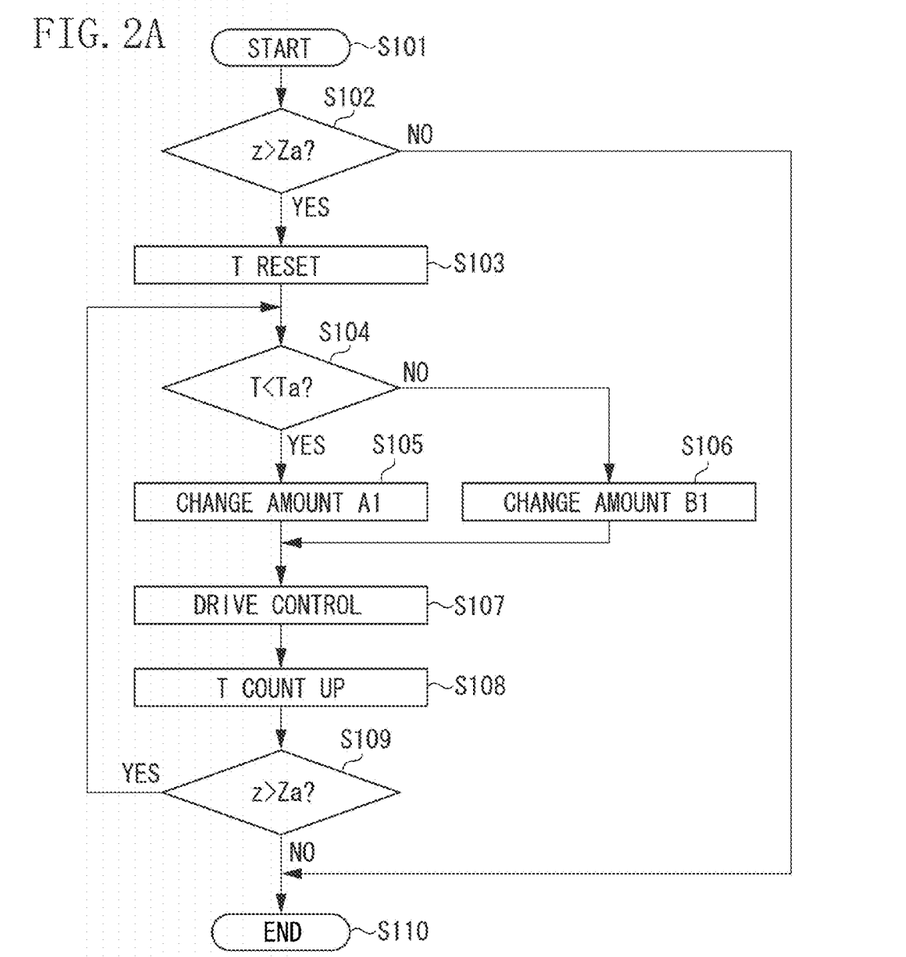
FIG. 2A is an example of a flowchart illustrating control of an EC element unit according to one or more aspects of the present disclosure.

FIG. 2A is a flowchart illustrating processing performed by the EC element unit according to the present exemplary embodiment. Step S101 indicates start of processing. Step S102 is a step of determining that an operation amount z of a user exceeds a threshold value Za. If the operation amount z of the operation unit is equal to or less than the threshold value Za (NO in step S102), the processing proceeds to step S110 to end the processing. If the operation amount z is larger than the threshold value Za (YES in step S102), the processing proceeds to step S103.

Step S103 is a step of resetting operation time T. Resetting the operation time means starting measurement of the operation time. The operation time T is reset, and the processing proceeds to step S104.

Step S104 is a step of determining that the operation time T is less than a threshold value Ta. In step S104, if it is determined that the operation time T is smaller than the threshold value Ta (YES in step S104), the operation is determined to be the first type operation. In this case, the processing proceeds to step S105, and the change amount is set to A1.

On the other hand, in step S104, if it is determined that the operation time T is equal to or larger than the threshold value Ta (NO in step S104), the operation is determined to be the second type operation. In this case, the processing proceeds to step S106, and the change amount is set to B1 larger than A1.

Step S107 is a step of drive-controlling the EC element based on the determination in step S104. The driver unit 3 changes the transmittance of the EC element 2.

Step S108 is a step of counting up the operation time T. By performing the count-up, it is possible to perform determination in step S108 and subsequent steps regardless of the number of counts up to step S107.

Step S109 is a step of determining that the operation amount z of a user after the count-up exceeds the threshold value Za. If the operation amount z is larger than the threshold value Za (YES in step S109), the processing returns to step S104. If the operation amount z is equal to or less than the threshold value Za (NO in step S109), the processing is ended in step S110.

Figure 2B:
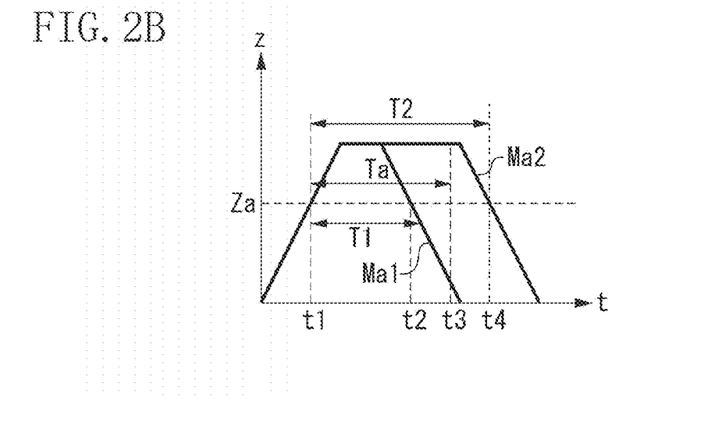
FIG. 2B is a diagram illustrating discrimination between a first type operation and a second type operation according to one or more aspects of the present disclosure.

FIG. 2B is a graph illustrating an operation of the EC element unit according to the present exemplary embodiment. The ordinate axis represents the operation amount z, and the abscissa axis represents the time t. Each of two figures Ma1 and Ma2 represents an operation.

The operation Ma1 is the first type operation. The operation amount z exceeds the threshold value Za at the time t1, and falls below the threshold value Za at the time t2 after the operation time T1 shorter than the threshold value Ta elapses. In this case, drive control in step S107 is drive-controlled such that the change amount is A1.

The operation Ma2 is the second type operation. The operation amount z exceeds the threshold value Za at the time t1, and falls below the threshold value Za at the time t4 after the threshold value Ta elapses at the time t3 and the operation time T2 longer than the threshold value Ta elapses. In this case, drive control in step S107 is performed such that the change amount is B1.

Until the operation is recognized as the second type operation, that is, during a period from t1 to t3, the operation may be recognized as the first type operation and may be recognized as the second type operation between t3 and t4 thereafter. In this case, during the period from t1 to t3, control is performed with the change amount A1, and during the period from t3 to t4, control is performed with the change amount B1.

The threshold value Za may be 0 or larger than 0. A case where the threshold value Za is 0 exhibits an effect of increasing the accuracy of an operation. On the other hand, a case where the threshold value Za is larger than 0 can suppress an erroneous operation of the operation unit.

In a case where the transmittance of the EC element is the maximum, it is also possible not to change drive control even if the first type operation or the second type operation is performed.

According to the present exemplary embodiment, the second type operation can be performed by pressing a button that is the operation unit for a long time. That is, the transmittance of the EC element can be controlled by a simple operation.

In other exemplary embodiments, in a case where the second type operation is determined according to operation time, the second type operation can be realized by a similar control to the present exemplary embodiment.

In a second exemplary embodiment, a difference between the first type operation and the second type operation is the change amount of the operation unit. Here, as an example of the operation unit, a button type operation unit will be described. The form of the operation unit may be a dial type or another type.

In the present exemplary embodiment, the second type operation is an operation in which the operation button depression amount is larger than that in the first type operation. A threshold value is set for the operation amount to discriminate the first type operation from the second type operation. Specifically, in a case where the button depression amount is smaller than the threshold value, the operation is the first type operation. In a case where the button depression amount is larger than the threshold value, the operation is the second type operation.

The operation unit 4 transmits a signal based on input information to the driver unit 3. The driver unit 3 changes control of the EC element 2 based on the signal from the operation unit, and controls change in the amount of transmitted light of the EC element. By performing the second type operation, the amount of change in the transmittance of the EC element can be larger than that by the first type operation.

Figure 3A:
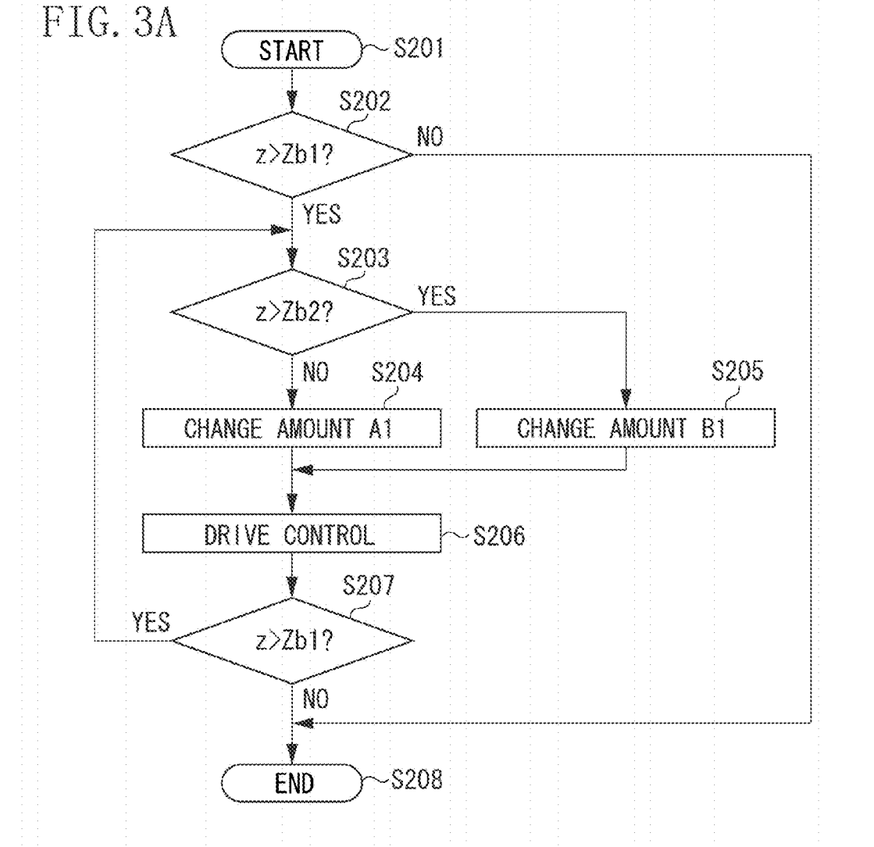
FIG. 3A is an example of a flowchart illustrating control of an EC element unit according to one or more aspects of the present disclosure.

FIG. 3A is a flowchart illustrating processing performed by the EC element unit according to the present exemplary embodiment. Step S201 indicates start of processing. Step S202 is a step of determining that the operation amount z exceeds a threshold value Zb. If the operation amount z of the operation unit 4 is equal to or less than a threshold value Zb1 (NO in step S202), the processing proceeds to step S208 to end the processing. On the other hand, if the operation amount z is larger than the threshold value Zb1 (YES in step S202), the processing proceeds to step S203.

Step S203 is a step of comparing the operation amount z with a threshold value Zb2. Here, the threshold value Zb2 is a value larger than the threshold value Zb1. If the operation amount z is equal to or less than the threshold value Zb2 (NO in step S203), the operation is determined to be the first type operation. In this case, the processing proceeds to step S204, and the change amount is set to A1.

On the other hand, if the operation amount z is larger than the threshold value Zb2 (YES in step S203), the operation is determined to be the second type operation. In this case, the processing proceeds to step S205, and the change amount is set to B1 larger than A1.

Step S206 is a step of drive-controlling the EC element based on the determination in step S203. The driver unit changes the transmittance of the EC element 2.

Step S207 is a step of determining an operation amount after drive change of the EC element. If the operation amount z is larger than the threshold value Zb1 (YES in step S207), the processing returns to step S203. If the operation amount z is equal to or smaller than the threshold value Zb1 (NO in step S207), the processing proceeds to step S208 to end the processing.

Figure 3B:
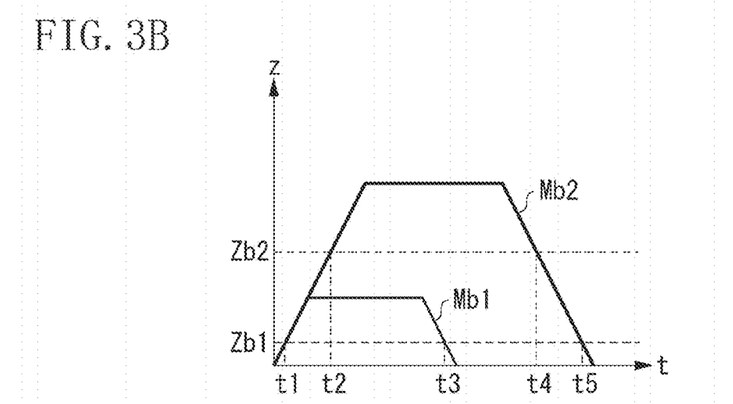
FIG. 3B is a diagram illustrating discrimination between a first type operation and a second type operation according to one or more aspects of the present disclosure.

FIG. 3B is a graph illustrating an operation of the EC element unit according to the present exemplary embodiment. The ordinate axis represents the operation amount z, and the abscissa axis represents the time t. Each of two figures Mb1 and Mb2 represents an operation.

The operation Mb1 is the first type operation. The operation amount z exceeds the threshold value Zb1 at the time t1, and falls below the threshold value Zb1 at the time t3 without exceeding the threshold value Zb2. In this case, drive control in step S206 is drive-controlled such that the change amount is A1.

The operation Mb2 is the second type operation. The operation amount z exceeds the threshold value Zb1 at the time t1, exceeds the threshold value Zb2 at the time t2, falls below the threshold value Zb2 at the time t4, and falls below the threshold value Zb1 at the time t5. In this case, drive control in step S206 is drive-controlled such that the change amount is B1.

The above description in the second exemplary embodiment is applied similarly to a button type operation unit and a dial type operation unit. That is, when the operation unit is a button type operation unit, the operation amount z is the button depression amount. When the operation unit is a dial type operation unit, the operation amount z is the dial turning amount. The dial turning amount can be also referred to as the rotation amount or the dial change amount.

According to the present exemplary embodiment, the second type operation can be performed by pressing a button that is the operation unit strongly. In a case where the operation unit is a dial, the second type operation can be performed by turning the dial strongly. That is, the transmittance of the EC element can be controlled by a simple operation.

In other exemplary embodiments, in a case where the operation is determined to be the second type operation according to the change amount of the operation unit, the second type operation can be realized by a similar control to the present exemplary embodiment.

In a third exemplary embodiment, a difference between the first type operation and the second type operation is the change speed of the operation unit.

Here, as an example of the operation unit, a dial type operation unit will be described.

In the present exemplary embodiment, the second type operation is an operation of turning a dial faster than the first type operation. The speed of turning a dial can be also referred to as the angular speed of the operation or the dial change speed. A threshold value is set for the dial change speed to discriminate the first type operation from the second type operation. Specifically, in a case where the dial change speed is smaller than the threshold value, the operation is the first type operation. In a case where the dial change speed is larger than the threshold value, the operation is the second type operation.

The operation unit 4 transmits a signal based on input information to the driver unit 3. The driver unit 3 changes control of the EC element 2 based on the signal from the operation unit, and controls change in the amount of transmitted light of the EC element. By performing the second type operation, the amount of change in the transmittance of the EC element can be larger than that by the first type operation.

A processing flow performed by the EC element unit according to the present exemplary embodiment is similar to that in the second exemplary embodiment. That is, the operation amount z is the speed of turning a dial and the angular velocity of a dial.

According to the present exemplary embodiment, the second type operation can be performed by turning a dial that is the operation unit fast. That is, the transmittance of the EC element can be controlled by a simple operation.

In other exemplary embodiments, in a case where the operation is determined to be the second type operation according to the change speed of the operation unit, the second type operation can be realized by a similar control to the present exemplary embodiment.

A fourth exemplary embodiment is similar to the first exemplary embodiment except for the change in transmittance by the second type operation. In the present exemplary embodiment, the stage of the transmittance is changed sequentially according to the second type operation. More specifically, the second type operation can be substituted for a plurality of first type operations.

Stop of the second type operation is an instruction to stop the change in the transmittance. The change in the transmittance may be stopped as soon as the second type operation is stopped, the predetermined amount of change in the transmittance may be continued, or a predetermined amount of operation time may be canceled.

The cancellation of a predetermined amount of operation time is to exclude a part of time of the second type operation at the time of end. In a case where the transmittance is changed while the transmittance is visually checked, the time to determine the end and the time to perform an operation of the end are not exactly the same in some cases. That is, there is a time difference from the time when it is determined to stop the change in the transmittance until the operation of changing the transmittance is actually stopped. Cancellation of the operation time can be set in consideration of this time difference. By canceling the operation time, the transmittance can be close to a transmittance intended by a user, and a re-operation for achieving the intended transmittance can be suppressed.

According to the present exemplary embodiment, the transmittance can be changed easily while the transmittance is checked, and therefore an EC element with a desired transmittance can be easily obtained.

The operation unit according to the present exemplary embodiment may be a button as in the first exemplary embodiment or a dial as in the third exemplary embodiment.

A fifth exemplary embodiment is similar to the first exemplary embodiment except that the second type operation is an operation in which a time interval between the first type operation and the first type operation is equal to or less than a predetermined time. The second type operation according to the present exemplary embodiment is similar to a double click in a mouse operation.

Distinction between succession of the first type operations and the second type operation can be made based on whether a time interval between the first type operation and the first type operation exceeds a threshold value thereof.

The second type operation according to the present exemplary embodiment may be an operation of setting the EC element to have a maximum transmittance or a minimum transmittance.

The operation unit according to the present exemplary embodiment may be a button as in the first exemplary embodiment or a dial as in the third exemplary embodiment.

After the second type operation according to the present exemplary embodiment is performed, an operation of the operation unit may be continued as it is. That is, after the second type operation, the operation may be continued without stopping the operation of the operation unit. In this case, the stage of the transmittance may be changed sequentially.

A sixth exemplary embodiment is similar to the second exemplary embodiment in the forms of the first type operation and the second type operation, and is similar to the fourth exemplary embodiment in the form of the change in the transmittance.

In the second type operation, the button depression amount is larger than that in the first type operation, for example. In a case where the second type operation is performed, the stage of the transmittance is changed sequentially. The second type operation can be substituted for a plurality of first type operations.

A seventh exemplary embodiment is an embodiment in which the change in the transmittance by the first type operation is a stepwise change in the transmittance, and the change in the transmittance by the second type operation is a continuous change in the transmittance. It can be said that the first type operation is a digital control of the transmittance and the second type operation is an analog control of the transmittance.

In a case where the second type operation is performed, the amount of change in the transmittance may be determined according to the operation time of the second type operation. In addition, there may be a lever that functions only in a case where the second type operation is performed. The lever may be mechanical or electric.

[Operation Unit]

Figure 4A:
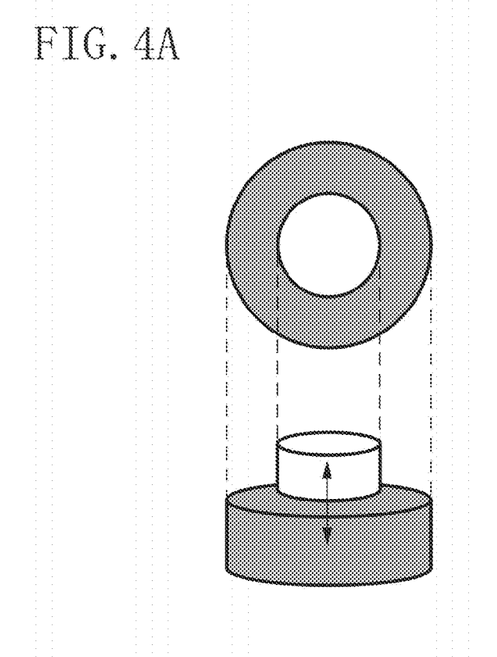
FIG. 4A exemplifies a button type operation unit.
Figure 4B:
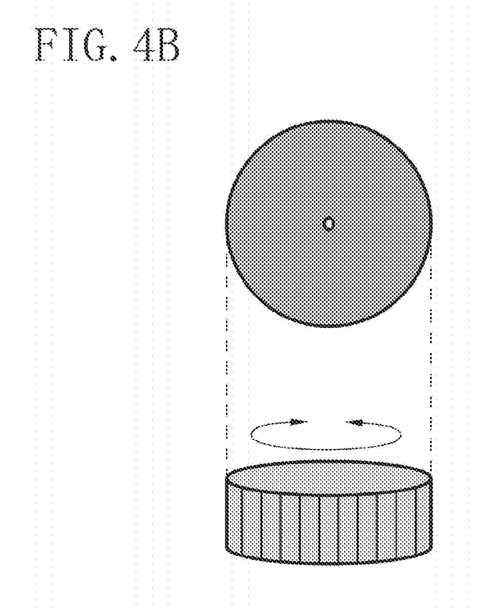
FIG. 4B exemplifies a dial type operation unit according to one or more aspects of the present disclosure.

FIGS. 4A and 4B are schematic diagrams exemplifying an operation unit. FIG. 4A exemplifies a button type operation unit. FIG. 4B exemplifies a dial type operation unit.

[Driver Unit]

Figure 5:
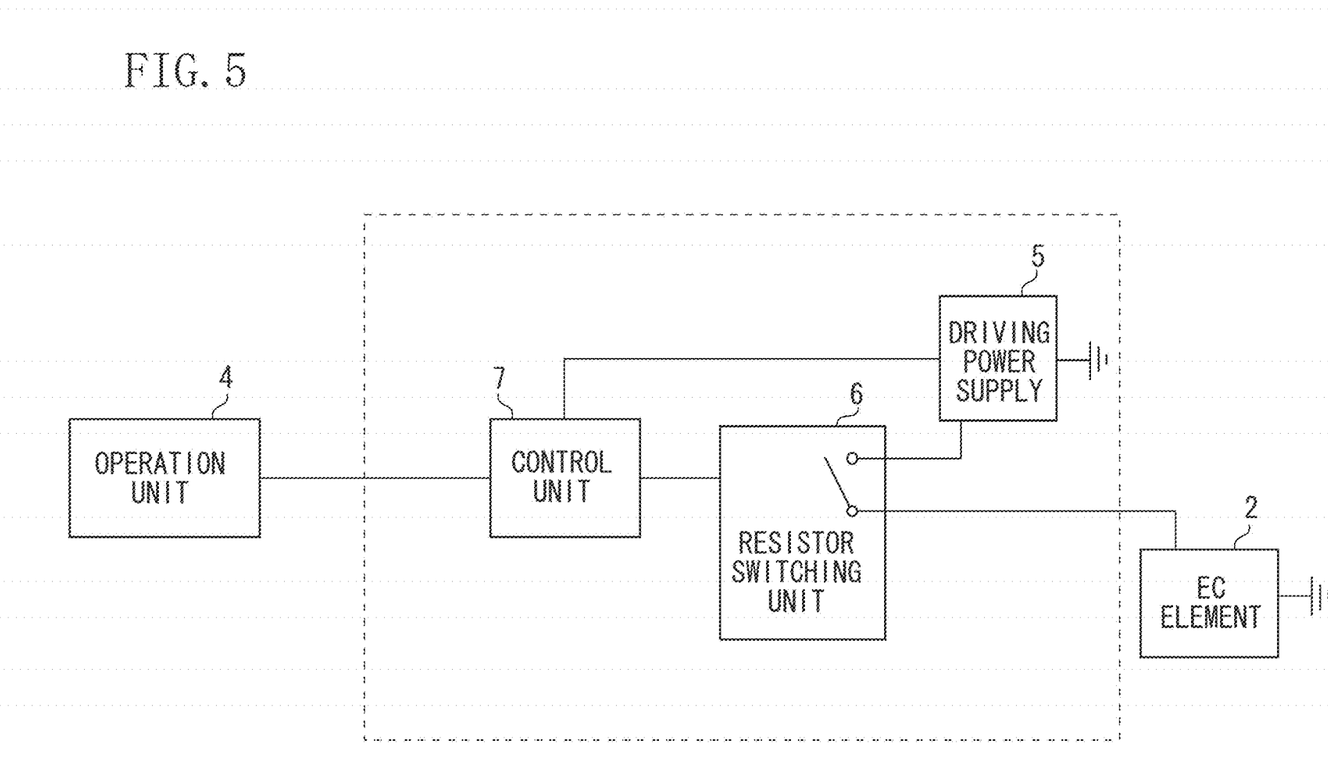
FIG. 5 is a schematic diagram exemplifying a driver unit according to one or more aspects of the present disclosure.

FIG. 5 is a schematic diagram exemplifying the driver unit 3. In this example, the driver unit using a pulse width modulation method is illustrated. The driver unit includes a driving power supply 5, a resistor switching unit 6, and a control unit 7, and is connected to the EC element 2 and the operation unit 4.

The driver unit applies a continuous driving pulse to the EC element 2, and changes the transmittance of the EC element with a duty ratio of the driving pulse.

The driving power supply 5 applies a voltage (driving voltage V1) at which at least one of an oxidation reaction and a reduction reaction of an EC material occurs to the EC element 2. In a case where an EC layer contains a kind of EC material, a value of V1 may be changed within a range in which a normal electrochemical reaction occurs.

Starting application of a voltage or retaining an applied state in the driving power supply 5 is performed with a signal of the control unit 7. The control unit 7 controls the duty ratio of a driving pulse by switching a resistor of the resistor switching unit 6. By changing the duty ratio, the transmittance of the EC element is changed.

The resistor switching unit 6 is electrically connected between the driving power supply 5 and the EC element 2, and a resistor therebetween is referred to as a resistor R1 or R2. The resistor R2 has a resistivity larger than the resistor R1.

The resistivity of the resistor R1 is desirably at least smaller than the largest impedance in the element, and is desirably 10Ω or less. The resistivity of the resistor R2 is desirably larger than the largest impedance in the element, and is desirably 1 MΩ or more. The resistor R2 may be air. In this case, strictly speaking, the circuit is an open circuit, but can be regarded as a closed circuit via air.

The control unit 7 sends a switching signal to the resistor switching unit 6, and performs control to be connected to the resistor R1 or R2. The driving power supply 5 applies a voltage necessary for the EC material contained in the EC layer to cause an electrochemical reaction to the EC element.

The driving voltage is desirably a constant voltage. Reasons therefor can be considered as follows. In a case where the applied voltage is large, deterioration is likely to be promoted due to an electrical load applied to the EC material, and an influence of electrical characteristics of impurities such as water or oxygen tends to be apparent.

Accordingly, a pulse width modulation method is desirable as a driving method. In the pulse width modulation method, the applied voltage is kept constant, and voltage application period in one period of a pulse, that is, a period in which an electrochemical reaction is controlled is adjusted. Because of drive at a constant voltage, an excessive electrical load on the EC material or an influence on electric characteristics of the impurities, which is a concern in a voltage modulation method, is suppressed.

Starting application of a voltage or retaining an applied state in the driving power supply is performed with a signal of the control unit 7, and in a case where the light transmittance of the EC element is maintained constant, the duty ratio is controlled to be constant.

[EC Element]

Figure 6:
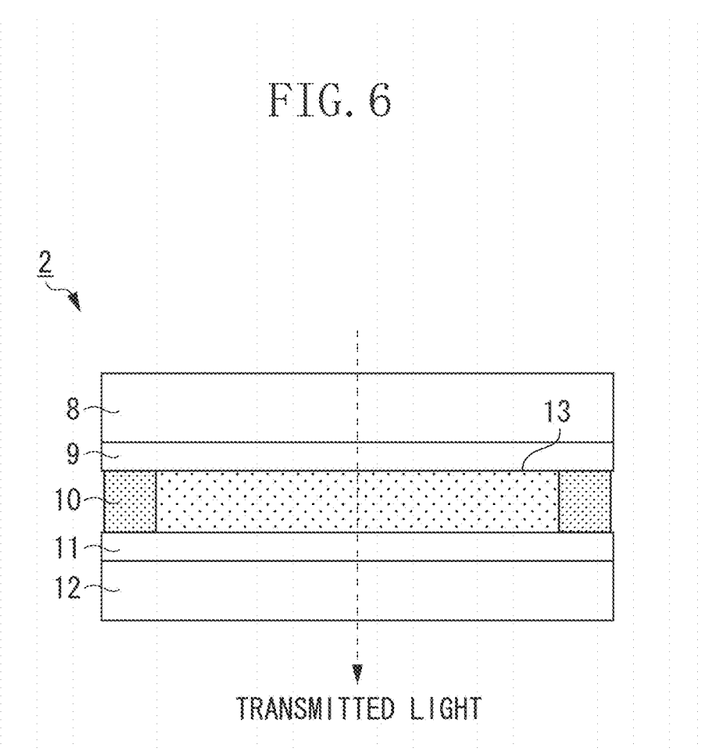
FIG. 6 is a schematic cross-sectional view of an example of an EC element according to one or more aspects of the present disclosure.

FIG. 6 is a schematic cross-sectional view exemplifying the EC element 2. The EC element 2 includes a pair of transparent substrates 8 and 12, a pair of transparent electrodes 9 and 11, a sealing material 10, and an EC layer 13. A distance between the pair of transparent electrodes 9 and 11 is defined by the sealing material 10. The sealing material can be also referred to as a spacer. An EC layer containing an EC material is disposed in a space formed by the pair of transparent electrodes and the sealing material. The EC layer may be a solid layer formed by a vapor deposition method or the like, or a solution layer in which an EC material is dissolved in an electrolyte solution. The EC layer is desirably a solution layer.

The EC layer may have a laminated structure of an electrolyte layer containing an electrolyte and a layer containing an EC material. The EC layer may contain only one kind of EC material or a plurality of kinds of EC materials.

In a case where the EC layer contains a plurality of kinds of EC materials, an absorption spectrum may be changed due to a difference in a redox potential and a difference in a molar absorption coefficient among the EC materials. Therefore, the driving voltage is desirably a constant voltage. In a case where the EC layer contains a plurality of kinds of EC materials, the EC layer may contain four or more kinds of EC materials including an anode material and a cathode material. The EC element according to an exemplary embodiment may contain five or more kinds of EC materials.

In a case where the EC layer contains a plurality of kinds of EC materials, a difference in a redox potential among the plurality of kinds of anode materials may be 60 mV or less, and a difference in a redox potential among the plurality of kinds of cathode materials may be 60 mV or less.

In a case where the EC layer contains a plurality of kinds of EC materials, the plurality of kinds of EC materials may contain a material having an absorption peak at 400 nm or more and 500 nm or less, a material having an absorption peak at 500 nm or more and 650 nm or less, and a material having an absorption peak at 650 nm or more. The absorption peak indicates an absorption peak having a half width of 20 nm or more. That is, no noise or the like at the time of measurement is included. Furthermore, in a case where light is absorbed, a state of a material may be an oxidation state, a reduction state, or a neutral state.

The EC material may be an organic compound or an inorganic compound. Examples of the organic EC material include a conductive polymer such as polythiophene or polyaniline, and an organic low molecular weight compound such as a viologen compound, an anthraquinone compound, an oligothiophene derivative, and a phenazine derivative. Examples of the inorganic EC material include a metal oxide material such as $TiO_2$, $NiO_x$, or $WO_3$.

The EC element according to an exemplary embodiment may be an EC element in which both an anodic EC compound and a cathodic EC compound are dissolved in a solvent, or an EC element in which only one of an anodic and cathodic EC compounds is dissolved in a solvent. Here, the former element is referred to as a complementary EC element, and the latter element is referred to as a monopolar EC element. The anodic EC compound is also referred to as an anode material, and the cathodic compound is also referred to as a cathode material.

In a case where the complementary EC element is driven, an electron is extracted from an EC material by an oxidation reaction at one electrode, and an EC material receives an electron by reduction at the other electrode. A radical cation may be generated from a neutral molecule by an oxidation reaction. In addition, a radical anion may be generated from a neutral molecule, or a radical cation may be generated from a dication molecule by a reduction reaction. EC materials are colored at both electrodes. Therefore, a complementary EC element is desirable in a case where a large optical density and low transmittance are required at the time of coloring.

On the other hand, the monopolar EC element consumes less power than the complementary EC element, and is therefore desirable. This is because the complementary EC element requires a large current to maintain a colored state. In the complementary EC element, radical cations of an anodic EC compound and a cathodic EC compound diffuse in a solution and collide with each other, cause a redox reaction, and are thereby decolored. In order to maintain the colored state, it is necessary to continue to cause a coloring reaction exceeding the above decoloring reaction.

Next, members constituting the EC element according to an exemplary embodiment will be described.

The electrolyte is not limited as long as being an ion-dissociable salt and exhibiting good solubility in a solvent and high compatibility in a solid electrolyte. Particularly, an electrolyte having an electron-donating property is desirable. These electrolytes can be also referred to as supporting electrolytes.

Examples of the electrolyte include inorganic ion salts such as various alkali metal salts and alkaline earth metal salts, quaternary ammonium salts, and cyclic quaternary ammonium salts.

Specific examples thereof include alkali metal salts of Li, Na, and K such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, and $KCl$, and quaternary ammonium salts and cyclic quaternary ammonium salts such as $(CH_3)_4NBF_4$, $(C_2H_5)_4NBF_4$, $(n-C_4H_9)_4NBF_4$, $(n-C_4H_9)_4NPF_6$, $(C_2H_5)_4NBr$, $(C_2H_5)_4NClO_4$, and $(n-C_4H_9)_4NClO_4$.

The solvent for dissolving the EC material and the electrolyte is not particularly limited as long as being able to dissolve the EC material and the electrolyte, but a solvent having polarity is particularly desirable. A medium in which the EC material and the electrolyte are dissolved is referred to as an EC medium. A solvent of the EC medium may also function as an electrolyte.

Specific examples thereof include water and an organic polar solvent such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, 3-methoxy propionitrile, benzonitrile, dimethylacetamide, methylpyrrolidinone, or dioxolane.

The EC medium may further contain a polymer or a gelling agent. In this case, the EC medium is a highly viscous liquid, and is gelled in some cases.

Examples of the polymer include polyacrylonitrile, carboxymethyl cellulose, a pullulan polymer, polyvinyl chloride, polyethylene oxide, polypropylene oxide, polyurethane, polyacrylate, polymethacrylate, polyamide, polyacrylamide, polyester, and Nafion (registered trademark).

Next, the transparent substrates and the transparent electrodes will be described. As transparent substrates 8 and 12, for example, colorless or colored glass, tempered glass, or the like is used. As these glass materials, an optical glass substrate such as Corning #7059 or BK-7 can be suitably used. Even a material such as a plastic or a ceramic can be appropriately used as long as having sufficient transparency.

The transparent substrate is desirably a material that is rigid and is unlikely to generate distortion. In the present exemplary embodiment, the term "transparent" means that the transmittance of visible light is 50% or more.

Examples of the plastic and the ceramic include polyethylene terephthalate, polyethylene naphthalate, polynorbornene, polyamide, polysulfone, polyethersulfone, polyetheretherketone, polyphenylene sulfide, polycarbonate, polyimide, and polymethyl methacrylate.

Examples of electrode materials 9 and 11 include indium tin oxide alloy (ITO), fluorine-doped tin oxide (FTO), tin oxide (NESA), indium zinc oxide (IZO), silver oxide, vanadium oxide, molybdenum oxide, a metal such as gold, silver, platinum, copper, indium, or chromium, and a metal oxide thereof, a silicon material such as polysilicon or amorphous silicon, and a carbon material such as carbon black, graphite, or glassy carbon.

In addition, a conductive polymer having conductivity improved by a doping treatment or the like, for example, polyaniline, polypyrrole, polythiophene, polyacetylene, polyparaphenylene, and a complex of polyethylene dioxythiophene (PEDOT) and polystyrenesulfonic acid are suitably used.

The EC element according to an exemplary embodiment desirably has high transmittance in a decolored state. Therefore, for example, ITO, IZO, NESA, poly(3,4-ethylenedioxythiophene) polystyrene sulfonate (PEDOT:PSS), and graphene are particularly desirable as the transparent electrode. These electrode materials can be used in various forms such as a bulk form and a fine particle form. Note that these electrode materials may be used singly or in combination of a plurality of kinds thereof.

The sealing material 10 is desirably a material that is chemically stable, does not allow gas and liquid to pass therethrough, and does not inhibit a redox reaction of the EC material. Examples of the sealing material include an inorganic material such as a glass frit, an organic material such as an epoxy resin, and a metallic material.

The EC element according to an exemplary embodiment may include a spacer. The spacer has a function of defining a distance between electrodes. The sealing material 10 may have a function of the spacer.

The spacer may be formed of an inorganic material such as silica beads or glass fibers, or an organic material such as polydivinylbenzene, polyimide, polytetrafluoroethylene, fluororubber, or an epoxy resin.

The EC element according to an exemplary embodiment may be used in an imaging device. The imaging device includes an optical unit having a plurality of lenses, an EC element unit, and an imaging element for receiving light passing through the EC element unit. The EC element unit may be disposed between the lenses and the imaging element, or may be disposed such that the lenses are disposed between the EC unit and the imaging element. Particularly, the EC element unit is desirably disposed immediately before the imaging element. Immediately before indicates that a lens or the like is not disposed between the EC element unit and the imaging element.

Examples of a method for forming the EC element according to the present exemplary embodiment include a method for injecting a liquid containing an EC material previously prepared by a vacuum injection method, an atmospheric injection method, a meniscus method, or the like, into a gap formed between a pair of electrode substrates.

Figure 7A:
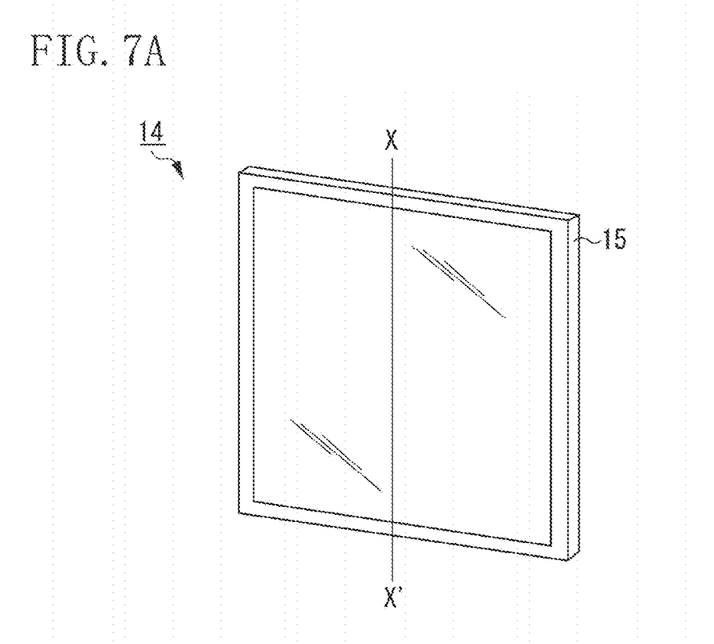
FIGS. 7A and 7B are schematic diagrams exemplifying a dimming window according to one or more aspects of the present disclosure.
Figure 7B:
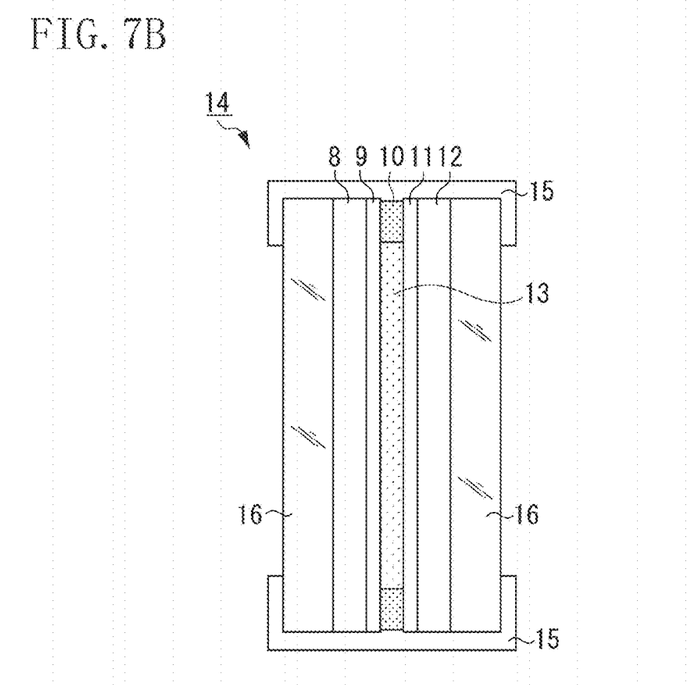

The EC element according to an exemplary embodiment may be used for a dimming window. FIG. 7A is a schematic diagram of a dimming window according to the present exemplary embodiment, and FIG. 7B is a schematic cross-sectional view taken along the line X-X' in FIG. 7A.

A dimming window 14 includes a pair of transparent plates 16, an EC element unit 1 disposed therebetween, and a frame body 15 that surrounds and integrates the entire dimming window 14. A driver unit and an operation unit in the EC element unit are not illustrated.

The transparent plates 16 are not particularly limited as long as being a material having high light transmittance, and it is desirably a glass material from a viewpoint of utilization as a window.

The dimming window 14 according to the present exemplary embodiment can adjust the incident amount of sunlight into a room during the day. The dimming window 14 can be applied to adjustment of not only the amount of sunlight but also the amount of heat, and can be therefore used for controlling brightness and temperature in a room. The dimming window can be applied to a glass window for a building, and a window of a vehicle such as an automobile, a train, an airplane, or a ship. In addition, the dimming window can be applied to an application in which blocking is performed such that an inside of a room cannot be seen from an outside of the room.

In a case where the dimming window 14 is applied to a window of a vehicle, the frame body 15 may be a body of the vehicle.

The dimming window 14 according to the present exemplary embodiment has a configuration in which the transparent plates 16 and the transparent substrates 8 and are separately present. In the dimming window 14 according to the exemplary embodiment, the transparent substrates 8 and 12 may also function as the transparent plates while the dimming window 14 does not include the transparent plates 16.

As described above, the EC element unit according to an exemplary embodiment can adjust the amount of transmitted light with a simpler operation in a case where it is desired to control the amount of change in the transmittance of the dimming window slightly or largely.

According to the present disclosure, by performing the first type operation and the second type operation for inducing a change in transmittance different from that in the first type operation, an EC element unit capable of changing the transmittance by a simple operation can be provided.

The EC element unit according to an exemplary embodiment can adjust the amount of transmitted light by a simple operation, and can be therefore used for a dimming window or the like.

While the present disclosure has been described with reference to exemplary embodiments, the scope of the following claims is to be accorded the broadest interpretation so as to encompass all such modifications and equivalent structures and functions.

This application claims the benefit of Japanese Patent Applications No. 2016-173143, filed Sep. 5, 2016, and No. 2017-113621, filed Jun. 8, 2017, which are hereby incorporated by reference herein in their entirety.

What is claimed is:

1. An electrochromic element unit comprising:
   an electrochromic element having a pair of electrodes and an electrochromic layer disposed between the pair of electrodes;
   a driver unit; and
   an operation unit connected to the electrochromic element via the driver unit,
   wherein the driver unit receives information from the operation unit and controls a transmittance of the electrochromic element,
   wherein the operation unit performs a first type operation and a second type operation, and
   wherein change in the transmittance of the electrochromic element by the second type operation is different from change in the transmittance of the electrochromic element by the first type operation.

2. The electrochromic element unit according to claim 1, wherein an amount of change in the transmittance of the electrochromic element by the second type operation is larger than an amount of change in the transmittance of the electrochromic element by the first type operation.

3. The electrochromic element unit according to claim 1, wherein the first type operation and the second type operation are operations with respect to a single operation unit.

4. The electrochromic element unit according to claim 1, further comprising a change unit configured to change an amount of change in the transmittance of the electrochromic element by the second type operation.

5. The electrochromic element unit according to claim 4, wherein the change unit is started by performing a third type operation.

6. The electrochromic element unit according to claim 1, wherein operation time of the second type operation is longer than operation time of the first type operation.

7. The electrochromic element unit according to claim 6, wherein control is performed to cancel a part of time at the time of end of the operation time of the second type operation.

8. The electrochromic element unit according to claim 6, wherein the information from the operation unit to the driver unit is different in a case where the second type operation is performed and in a case where the first type operation is performed.

9. The electrochromic element unit according to claim 1, wherein a change amount of the operation unit by the second type operation is larger than a change amount of the operation unit by the first type operation.

10. The electrochromic element unit according to claim 1, wherein the operation unit consists a button or a dial.

11. The electrochromic element unit according to claim 1, wherein the second type operation is analog control of transmittance.

12. The electrochromic element unit according to claim 1, wherein the transmittance of the electrochromic element is changed to a maximum transmittance or a minimum transmittance by the second type operation.

13. The electrochromic element unit according to claim 1, wherein driving of a change in the transmittance of the electrochromic element is performed by a pulse width modulation method.

14. The electrochromic element unit according to claim 1, wherein the electrochromic element contains a plurality of kinds of electrochromic materials.

15. The electrochromic element unit according to claim 14, wherein the plurality of kinds of electrochromic materials is a plurality of kinds of anode materials or a plurality of kinds of cathode materials, and
   wherein a difference in a redox potential among the plurality of kinds of anode materials is 60 mV or less, and a difference in a redox potential among the plurality of kinds of cathode materials is 60 mV or less.

16. The electrochromic element unit according to claim 14, wherein the plurality of kinds of electrochromic materials includes a material having an absorption peak at 400 nm or more and 500 nm or less, a material having an absorption peak at 500 nm or more and 650 nm or less, and a material having an absorption peak at 650 nm or more.

17. The electrochromic element unit according to claim 1, wherein the electrochromic layer contains a polymer or a gelling agent.

18. A dimming window comprising a pair of transparent substrates and an electrochromic element unit disposed between the pair of transparent substrates, wherein the electrochromic element unit is the electrochromic element unit according to claim 1.

19. An imaging device comprising:
an optical unit having a plurality of lenses;
the electrochromic element unit according to claim 1; and
an imaging element configured to receive light passing through the electrochromic element unit.

20. The electrochromic element unit according to claim 1, wherein a ratio of change in transmittance of the electrochromic element by the second type operation is different from a ratio of change in transmittance of the electrochromic element by the first type operation.

21. The electrochromic element unit according to claim 20, wherein the ratio of change in transmittance of the electrochromic element by the second type operation is faster than the ratio of change in transmittance of the electrochromic element by the first type operation.

22. An electrochromic element unit comprising:
an electrochromic element having a pair of electrodes and an electrochromic layer disposed between the pair of electrodes;
a driver unit; and
an operation unit connected to the electrochromic element via the driver unit,
wherein the driver unit receives information from the operation unit and controls a transmittance of the electrochromic element,
wherein the operation unit performs a first type operation and a second type operation, and
wherein the information from the operation unit to the driver unit is different in a case where the second type operation is performed and in a case where the first type operation is performed.

23. An electrochromic element unit comprising:
an electrochromic element having a pair of electrodes and an electrochromic layer disposed between the pair of electrodes; and
an operation unit connected to the electrochromic element,
wherein the operation unit performs a first type operation and a second type operation, and
wherein a ratio of change in transmittance of the electrochromic element by the second type operation is greater than a ratio of change in transmittance of the electrochromic element by the first type operation.

24. The electrochromic element unit according to claim 23, wherein an amount of change in the transmittance of the electrochromic element by the second type operation is larger than an amount of change in the transmittance of the electrochromic element by the first type operation.

25. The electrochromic element unit according to claim 23, wherein the first type operation and the second type operation are operated by a single operation unit.

26. The electrochromic element unit according to claim 23, wherein the electrochromic element contains a plurality of kinds of electrochromic materials.

27. The electrochromic element unit according to claim 26,
wherein the plurality of kinds of electrochromic materials is a plurality of kinds of anode materials or a plurality of kinds of cathode materials, and
wherein a difference in a redox potential among the plurality of kinds of anode materials is 60 mV or less, and a difference in a redox potential among the plurality of kinds of cathode materials is 60 mV or less.

28. The electrochromic element unit according to claim 27, wherein the plurality of kinds of electrochromic materials includes a material having an absorption peak at 400 nm or more and 500 nm or less, a material having an absorption peak at 500 nm or more and 650 nm or less, and a material having an absorption peak at 650 nm or more.

29. The electrochromic element unit according to claim 28, wherein the electrochromic layer contains a polymer or a gelling agent.

30. A dimming window comprising a pair of transparent substrates and an electrochromic element unit disposed between the pair of transparent substrates, wherein the electrochromic element unit is the electrochromic element unit according to claim 23.

31. An imaging device comprising:
an optical unit having a plurality of lenses;
the electrochromic element unit according to claim 23; and
an imaging element configured to receive light passing through the electrochromic element unit.

* * * * *